April 16, 1968     G. RABINOVITCH     3,377,979
MARKERS FOR THE AERIAL SPRAYING OR DUSTING OF FIELDS
Filed June 18, 1965
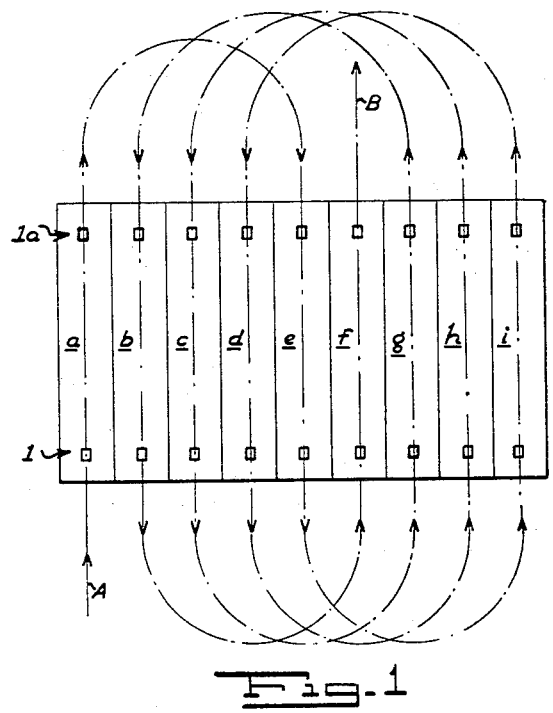
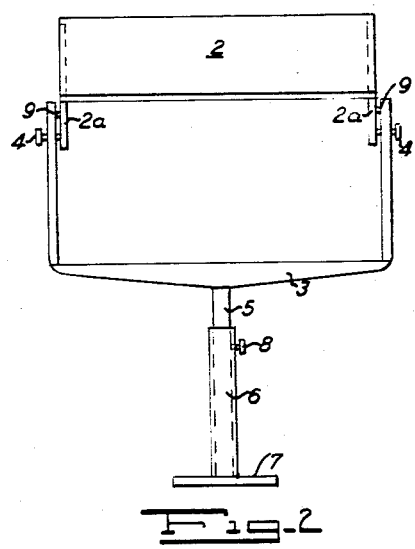
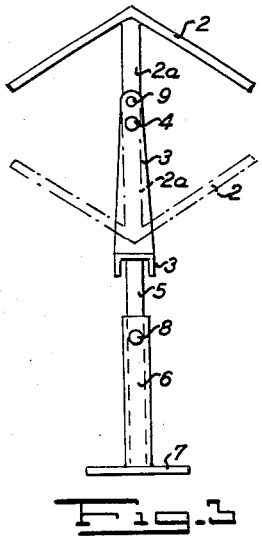
INVENTOR
GERSHON RABINOVITCH ited States Patent Office 3,377,979
Patented Apr. 16, 1968

3,377,979
MARKERS FOR THE AERIAL SPRAYING
OR DUSTING OF FIELDS
Gershon Rabinovitch, Shderot Hatemarim 3,
Ramat Gan, Israel
Filed June 18, 1965, Ser. No. 465,084
6 Claims. (Cl. 116—63)

ABSTRACT OF THE DISCLOSURE

Apparatus for providing locational information to a pilot in a low flying aircraft, constituted by marker devices arranged in parallel continguous strips, one marker device being provided at each end of a strip. Each marker device includes a rotatable member mounted on a frame via an adjustable release mechanism which permits the member to rotate under the force of the slipstream of the aircraft, the rotatable member having recognizably different indicia thereon to indicate to the pilot whether or not the aircraft has passed thereover.

---

This invention relates to markers for the aerial spraying or dusting of fields with chemical preparations having a desired action on the crop or soil.

The aerial spraying (which term will hereinafter be understood to include dusting) of fields is carried out by aircraft flying very low, in fact closely above the ground, in zig-zagging runs across the field along straight strips whose width is so calculated that virtually continuous and uniform spraying is achieved over the entire area of the field.

In order to guide the aircraft to the strip that has to be sprayed next it has been the practice to post signalling men at both ends of the strip. When the aircraft approaches, they have to crouch or lie down in order not to be injured, and even so, accidents frequently occur. Moreover, in order to be in time for the next run and also in order not to have to move too much, the signalling men can shift their position from the strip just sprayed to a contiguous strip only. Finally the aircraft has to carry out complicated manoeuvers in order to return to the field over the strip adjacent to the one that had been sprayed in the course of the last preceding one.

Attempts hitherto made to replace the signalling men by mechanical or chemical (moisture-responsive) indicators or markers have failed in practice.

The invention, therefore, has the object to provide markers for guiding the aircraft in the aerial spraying of fields without the aid of ground personnel. The invention also provides an arrangement of the markers on the field in such a manner that the aircraft, at the end of each run, can turn about in a relatively wide arc in order to make the next run over a strip not contiguous with the one sprayed in the course of the last preceding run, and yet cover the whole field strip by strip.

The invention consists in a marker for use in the aerial spraying of fields, comprising a mobile member which is displaced under the action of an impact produced by the aircraft from a "ready-for-operation" position into an "after-operation" position of the marker, which member is not responsive to winds up to the strength at which aerial spraying can be carried out, the marker being designed to show by the position of said member and/or by special marking, visible from above, in which of the two positions the marker is at the moment of observation.

The markers which are still in the "ready-for-operation" position indicate that the aircraft has not yet passed over the strip or strips where these markers are placed. The markers which have assumed the "after-operation" position indicate the strips over which the aircraft has passed.

The impact produced by the aircraft for moving the mobile member of the marker from the ready-for-operation position into the after-operation position may be, for example, the slipstream of the aircraft, or a bodily blow applied to the mobile member by a body hanging down from the aircraft.

According to a further feature of the invention, these markers are disposed in pairs at the opposite ends of parallel contiguous strips of the field to be sprayed, and remain there during the entire spraying operation without having to be shifted. This enables the aircraft to follow a flying pattern in which it can turn in a relatively wide arc after the completion of a run to a strip that is not contiguous with the one sprayed in the last preceding run but relatively remote from it in order to return later to the strip or strips thus skipped between consecutive runs.

The response of the mobile member of the marker to the impact produced by the aircraft may either be a direct, mechanical one, whereby the contact of a body hanging down from the aircraft, or the air-pressure generated by the slipstream, tilts or collapses the mobile member, or an indirect one in that an impact-responsive member of the marker acts on a part which operates means for turning or collapsing the mobile member. Such means may be, for example, a microswitch connected in the circuit of an electromagnet designed to actuate the mobile member.

The invention is illustrated, by way of example only, in the accompanying drawings in which:

FIG. 1 is a diagrammatic plan view of a field to be sprayed, indicating the disposition of the markers and the run of the aircraft;

FIG. 2 is a front elevation of a marker according to the invention in the "ready-for-operation" position;

FIG. 2a is a horizontal sectional view showing on an enlarged scale the detent structure;

FIG. 3 is a corresponding side elevation, indicating in addition the "after-operation" position in dashed lines.

According to FIG 1, the field to be sprayed is ideally divided into nine contiguous transverse strips marked a–i. The strips are made so wide that with a given spraying range of the aircraft a substantially uniform spraying of the entire field is achieved. At each end of each strip a marker 1, 1a is placed. The aircraft makes its first run over the strip a, as indicated by the arrow A, causing first the marker 1, then the marker 1a of that strip to assume the "after-operation" state. Then it turns in a wide arc and next flies over the strip e, actuating first the marker 1a and then the marker 1 of that strip. The next strip to be sprayed is the strip i, and after this follow the strips d, h, c, g, b, f, in this order. The operation is ended when the aircraft has operated the marker 1a of the strip f and it leaves the field as indicated by the arrow B. This flying pattern shows that the aircraft has no difficulty in reversing its flying direction at the end of each run since it can do so in a wide arc.

The marker illustrated in FIGS. 2 and 3 comprises a member 2 in the form of a gable roof of V-shape mounted on arms 2a which are pivoted to a fork-shaped bracket 3 by means of axles 4. The bracket 3 is secured to a stem 5 which is slidably inserted in a tubular post 6 secured to a foot 7. The height of the bracket 3 above the ground can be varied by more or less drawing out the stem 5 from the post 6. In each desired position the stem can be fixed by means of a clamping screw 8.

A spring-loaded pin 9 is interposed between the top end of one of the prongs of bracket 3 and one of the arms 2a of the tiltable member 2, whereby the latter is held in the "ready-for-operation" state of the marker, in which the member 2 is in a state of unstable equilibrium and apt to topple over, were it not for the pin 9. This pin, which snaps into a shallow depression of the arm 2*a* concerned, does not yield to wind pressure on the roof of the member 2 up to such a strength at which aerial spraying can at all be carried out, for at high winds, aerial spraying becomes impossible because the spray is carried off. However, the slip-stream of the aircraft is very much stronger than such winds and overcomes the resistance of the pin 9, whereby the member 2 is allowed to swing down into the position indicated in dashed lines in FIG. 3. This latter position corresponds to the "after-operation" state of the marker.

The change of position of the member 2 can be recognized by the pilot who can thus know which parts of the field have been sprayed and which parts are still to be sprayed. In order to make the situation still clearer, markings can be provided on the member 2 which make it unmistakably clear whether the marker is in the "ready-for-operation" position or the "after-operation" position. For example, the face of member 2 which is turned upwards in the "ready-for-operation" position may be painted a certain color, say white or red, and its opposite face, the one which is turned up in the "after-operation" position, may be painted a different color, preferably green, which makes the marker almost indistinguishable from the green crop on the field. In this case, the not-yet-sprayed strips of the field are pointed out by the colors of the markers, while the colors disappear where the field has been sprayed.

This type of marker can also be used in an arrangement in which the member 2 is adapted to be toppled over not by the slipstream of the aircraft but by a part hanging down from the latter, e.g. a rubber ball secured to the end of a cord of nylon or the like.

I claim:

1. A field marking device adapted to provide locational information to a pilot in a low flying aircraft, wherein said device includes a first and second indicium, each being recognizably different and distinguishable by said pilot, said device comprising:

(a) a supporting member for supporting said marking device above the ground;

(b) a frame member positioned on said supporting member, and including two vertical members attached in spaced relationship;

(c) a member positioned between said vertical members and journalled in each of said vertical members, whereby said member may rotate about an axis which is substantially horizontal, said member including a roof portion and being rotatable between two positions, said roof portion having first and second surfaces facing in opposite directions and on which the first and second indicium are respectively provided, said first indicium being visible to said pilot in the first position of said member and the second indicium not being visible to said pilot, said second indicium being visible to said pilot in the second position of said member and the first indicium not being visible to said pilot, the rotation of the member from the first to the second position being effected by the wind force of the slipstream of said low flying airplane as it passes over said marking device; and (d) adjustable releasing means positioned on at least one of said vertical members adapted to co-act with said member, whereby said member is permitted to rotate responsive to a wind force at least as great as said slipstream wind force, whereby the passing over of a low flying aircraft changes the visible indicium, thereby marking and indicating to the pilot the passing over of said aircraft.

2. A marker device according to claim 1, wherein said roof portion of said member is V-shaped, said member further comprising two vertical support members fixedly attached to said roof portion and rotatably attached to said frame vertical members such that in the first position said roof portion is in a first vertical position supported by said support vertical members, showing to the pilot the first indicium, and responsive to the aircraft slipstream wind force, said member rotates to its second position and the roof portion drops to a second vertical position wherein said roof member is suspended from said members showing the second indicium to said pilot.

3. A marker device according to claim 1, wherein the indicia have distinguishably different colors.

4. A marker device according to claim 1, wherein said adjustable releasing means is a spring loaded cam.

5. A marker device according to claim 4, wherein said spring loaded cam is adjusted so that said marker device will not be responsive to prevailing wind forces and will respond to wind forces as large as a slipstream wind force.

6. A marker device according to claim 1, wherein said roof portion of the rotatable member has substantial width and opposite surfaces on which said indicia are respectively applied, one of said surfaces facing upwardly in said first position while the other surface faces downwardly, whereas in the second position said one surface faces downwardly and the other surface faces upwardly.

References Cited

UNITED STATES PATENTS

| | | | |
|---|---|---|---|
| 615,443 | 12/1898 | Foster | 272—59 |
| 688,832 | 12/1901 | Davis | 40—138 |
| 1,845,590 | 2/1932 | Edwards | 40—125 |
| 2,881,543 | 4/1959 | De Rouen | 40—125 |
| 3,162,847 | 12/1964 | Huffman | 40—39 |

LUIS J. CAPOZI, *Primary Examiner.*